US005181050A

United States Patent [19]

Bibl et al.

[11] Patent Number: 5,181,050

[45] Date of Patent: Jan. 19, 1993

[54] METHOD OF FABRICATING AN INTEGRATED THICK FILM ELECTROSTATIC WRITING HEAD INCORPORATING IN-LINE-RESISTORS

[75] Inventors: Andreas Bibl, Los Altos; George H. Fellingham, San Jose, both of Calif.

[73] Assignee: Rastergraphics, Inc., Sunnyvale, Calif.

[21] Appl. No.: 819,025

[22] Filed: Jan. 10, 1992

Related U.S. Application Data

[60] Division of Ser. No. 619,256, Nov. 28, 1990, which is a continuation-in-part of Ser. No. 410,594, Sep. 21, 1989, Pat. No. 4,977,416.

[51] Int. Cl.[5] ..................... G01D 15/06; H01R 43/00; B44C 1/22; B29C 37/00

[52] U.S. Cl. ..................................... 346/155; 29/854; 156/643; 156/655; 156/668

[58] Field of Search ....................... 156/643, 655, 668; 346/155; 29/854

[56] References Cited

U.S. PATENT DOCUMENTS 3,808,675 5/1974 Iiyama et al. ........................ 29/592
3,903,594 9/1975 Koneval ................................ 29/603
4,287,525 9/1981 Tagawa ................................ 346/155
4,806,957 2/1989 Beegan ................................ 346/155
4,920,363 1/1989 Hack .................................. 346/155

*Primary Examiner*—George H. Miller, Jr.
*Attorney, Agent, or Firm*—Michael Hetherington

[57] ABSTRACT

An improved electrographic writing head employs interleaved arrays of writing nibs and small geometry, high impedance, thick film resistors and semiconductor driver circuits fabricated on a glass epoxy substrate. The writing head achieves significant savings in manufacturing costs by using low cost printed circuit and thick film technology. Power consumption may be reduced by more than half over prior art devices due to the high impedance of each thick film pull up resistor coupled with a associated writing neb. A ground plane is disposed internally of the substrate and between adjacent arrays of writing nibs. The ground plane prevents electrical interaction between the substrates and prevents the formation of parasitic nib-to-nib capacitance by shunting parasitic capacitance currents to ground. The ground plane thus reduces the possibility of flaring and substantially eliminates inadvertent writing by adjacent nibs.

19 Claims, 5 Drawing Sheets

METHOD OF FABRICATING AN INTEGRATED THICK FILM ELECTROSTATIC WRITING HEAD INCORPORATING IN-LINE-RESISTORS

RELATED APPLICATIONS

This is a division of co-pending application Ser. No. 07/619,256, filed on Nov. 28, 1990, which is a continuation in part of co-pending application Ser. No. 410,594, filed Sep. 21, 1989, now U.S. Pat. No. 4,977,416, entitled, Integrated Thick Film Electrostatic Writing Head, and assigned to the same assignee as the present invention.

BACKGROUND OF THE INVENTION

This invention relates to electrographic writing heads for recording information on a dielectric recording medium and in particular to an improved electrographic writing head employing interleaved arrays of writing nibs, small geometry thick film resistors and semiconductor driver circuits fabricated on adjacent glass epoxy substrates, or on opposite surfaces of a single substrate, separated by a ground plane.

In the prior art, an electrographic writing head ordinarily consists of an array of electrodes, which are either wire wound or deposited on an insulating substrate. The electrodes terminate in writing nibs which are held close to the dielectric surface of a writing medium. The opposite surface of the writing or recording medium is conductive and is coupled with a counter electrode which is held at a predetermined voltage potential relative to the writing nibs.

Low voltage control signal lines may selectively address writing nibs or groups of writing nibs to cause an electrical discharge from the nib to the recording medium. The charge deposited on the recording medium is developed into an image by the application of a liquid or powdered toner which clings to the recording medium by electrostatic attraction between the deposited charge on the recording medium and oppositely charged colored toner particles.

The writing nibs ar typically connected together in groups wherein the groups of nibs share control electronics. For example, many writing nibs may be connected together to a single high voltage driver circuit. This creates a multiplexed writing head. The counter electrode behind the recording medium is also segmented with each segment being energized synchronously with its corresponding group of nibs.

Although the multiplexing scheme according to the prior art reduces the number of switching elements, it also adds a considerable amount of complex circuitry. This added complexity for the sake of saving switching elements has several serious disadvantages.

A significant problem in prior art electrographic writing heads concerns the appearance of unwanted bands in written images at the counter electrode boundaries. Because all the writing nibs can not be energized simultaneously, they must also share the time it takes the recording medium to move from one scan line position to the next. This creates the need for relatively high speed and hence high power electronics on the writing heads. The increased power demand of a typical prior art multiplexed writing head raises cost by necessitating expensive power supplies and high power consumption. The increased power demand in prior art electrographic writing heads also reduces reliability.

Yet another problem inherent in prior art multiplexed electrographic writing heads, is that the constant switching of fairly high capacitance nib groups requires expensive high voltage driver circuits with high current sinking capability in order to attain reasonably fast writing speed. Therefore at maximum plotting speeds, the power consumption of an entire multiplexed nib array can be significant.

Most prior art electrographic writing heads also suffer from a problem known as "flaring". This occurs when the charged deposited on the recording medium does not follow the outline of the nib delivering it, but rather spreads in an uncontrolled manner over the medium. Flaring is caused by excessive discharge from the writing nibs due to the buildup of energy in the capacitance that inherently exits between spatially adjacent writing nibs. Upon discharge of a writing nib, the energy of this stored capacitance may also be discharged, resulting in an arc which may be uncontrolled.

The severity of flaring depends upon the nib-to-nib and nib-to-ground capacitances. If these capacitances can be minimized, the flaring may be reduced, since the stored energy available for causing flares is also reduced.

A further disadvantage inherent in prior art multiplexed writing heads, wherein many nibs are connected to a single high voltage driver, is that plotting speed may be limited due to the need for a minimum write time of 20 to 30 microseconds per writing group. Any less writing time would result in severe image degradation. With an average of 50 nib writing groups, the speed at which one scan line may be drawn is determined by the product of the minimum writing time times the number of writing groups, thus approximately 1000 to 1500 microseconds. This translates into two inches per second at 400 lines per inch resolution or less than 1 inch per second at 1000 lines per inch. It will be appreciated that the prior art is severely limiting for high speed printing applications.

Another disadvantage of a prior art multiplexed writing heads is the uneven charge distribution at the fringes of each nib group which may result in image striations or "banding" during the writing and toning process. This is a considerable problem in the prior art and many attempts have been made to minimize uneven charge distribution, but to no avail.

Prior art writing head structures have the disadvantage of taking up prohibitively large amounts of space with so called mother boards, including large and bulky connectors and so called daughter boards which contain large number of high voltage drivers as well as pull-up and series resistors. These prior art interconnect schemes are unduly space consuming and are in addition prohibitively expensive and unreliable.

In addition, in order to achieve reasonably fast RC writing time constants on the order of 100 microseconds, the value of the pull-up resistors needs to be fairly low. This however, has the disadvantage of high power dissipation and low reliability when several thousand nibs are switching simultaneously.

In the prior art, other attempts have been made to substantially reduce intercoupling capacitance and flaring by using thin film elements in an electrographic writing head. Thin film elements are disadvantageous because they are very expensive to manufacture and require complex processing techniques as compared to thick film elements which may be implemented on printed circuit boards.

Previously, it was thought impractical or impossible to use exclusively thick film elements in an integrated electrographic writing head. The lower limit of writing nib thickness is governed by catastrophic damage of the writing nib end due to disintegration upon application of a high voltage and subsequent discharge. Although it is possible to reduce the energy delivered to the nib, there is a limit as to how far the voltage can be reduced and still obtain a suitable writing discharge. It was further believed however, erroneously, that "[T] he upper limit of nib write end thickness is governed by a thickness that is too large providing too much capacitance and defeating the purposes sought after . . .". See, for example, U.S. Pat. No. 4,776,450, issued Aug. 23, 1988 at col. 4, lines 24-27.

In view of the foregoing disadvantages of prior art devices, it is apparent that what is needed is an improved electrographic writing head which is able to achieve the seemingly contradictory objectives of maintaining fast RC time constants and high writing speed while minimizing power consumption.

What is also needed is an improved electrographic writing head which has greater reliability while at the same time minimizing inter nib capacitance and consequently reducing flaring and other nonconformities in plotting operations.

SUMMARY OF THE INVENTION

All of the foregoing disadvantages and deficiencies of prior art electrographic writing heads are solved by the present invention which employs for the first time standard printed circuit, thick film and surface mount assembly technologies including high impedance thick film resistors to produce an electrographic writing head wherein all elements including control circuitry are integrated onto a multilayer substrate. The present combination of thick film elements and non-multiplexed control circuitry result in a substantial savings in terms of manufacturing costs and power consumption over prior art electrographic writing heads.

The present invention provides an improved integrated thick film writing head manufacturable as a printed circuit for recording information upon a dielectric medium such as paper. The writing head according to the present invention incorporates an array of small geometry, high impedance thick film resistors associated with each array of writing nibs for substantially eliminating inter nib capacitance and flaring. The thick film elements are screened on first and second high resolution glass epoxy substrates which are disposed in adjacent back to back relation. A multitude of integrated MOS driver circuits are provided on the substrates and each driver is individually coupled with a single writing electrode.

As will be explained, another aspect of the invention discloses that the thick film resistor elements, arrays of writing nibs and associated circuitry are disposed on opposite surfaces of a single substrate, separated by at least one ground plane disposed at an intermediate location within the body of the substrate.

In a preferred embodiment, each writing electrode includes a writing nib end for placing an electrostatic charge corresponding to a dot of information on a recording medium which is passed in close proximity thereto. The terms writing nib and writing electrode may be used interchangeably to describe the means for placing the electrostatic charge on the recording medium. The planar glass epoxy substrates have writing nibs disposed in a linear array at an edge thereof such that said first and second arrays of writing nibs are offset in an interleaved pattern. Each writing nib of the first substrate is offset by one dot width relative to a writing nib of the second substrate in the direction along the plane of said substrates and the nib array of the first substrate is separated in a preferred embodiment by two dot pitches from the nib array of said second substrate in a direction perpendicular to the plane of said substrates. However, it is readily understood that the nib array of the first substrate may be separated by n dot pitches from the nib array on the second substrate, or on the opposite surface of the same substrate, where n is an integer.

A ground plane consisting of any conducting material is disposed between the first and second substrates and between the adjacent arrays of writing electrodes for controlling the shape of the electric field around each nib and for shunting electric field lines to ground.

A plurality of thick film, high impedance resistor means are formed on the surfaces of the first and second substrates, each resistor means being coupled, preferably as close as possible, to a corresponding writing nib for minimizing the nib to ground capacitance. This advantageously avoids flaring.

A plurality of high voltage semiconductor switch means are also provided on the surfaces of the substrates wherein each switch means has its drain coupled with a corresponding one of said writing nibs through an associated thick film resistor means. Each high voltage switch means selectively enables a corresponding writing nib when the switch means is in a first state.

A high voltage line is provided on said first and second substrates for charging said writing nibs to a high voltage when said corresponding switch means is in a first state.

An array of high impedance, thick film pull-up resistors are formed on the outer layer of said first and second substrates, each pull-up resistor connecting said high voltage line with said drain of a corresponding switch means for controlling the charging current applied to each writing nib when said corresponding switch means is in a first state. The ground plane provided between said first and second substrates also prevents electrical interaction between substrates and minimizes intercoupling between adjacent elements on the same substrates.

In an alternate embodiment, the high impedance, thick film resistors and pull-up resistors associated with each writing nib may be fabricated together, in a line, on the same side of a single substrate. This advantageously eliminates two or more feedthrough holes for each writing nib, thereby simplifying construction and greatly reducing fabrication costs.

This embodiment has an additional advantage, in that by using a very dense integrated circuit package such as, for example, tape automated bonding (TAB) for driver circuitry, it is possible to keep all the circuitry on the outside surface of the substrate. It will be appreciated that when all circuitry is fabricated on the outside surface of a single substrate, this eliminates all feedthrough holes in the writing array. Accordingly, it is possible to build a writing head from a single substrate with circuitry disposed on opposite sides of the substrate. However, the substrate must have at least one, internal ground plane disposed in the body of the substrate. Such a ground plane can be manufactured integrally with the substrate by the substrate manufacturer at comparatively low cost.

In accordance with this embodiment, a single substrate consisting of planar glass epoxy or the like has writing electrodes having their writing nib ends disposed in a linear array at an edge of the opposite surfaces of the substrate. The first and second arrays of writing electrodes are arranged such that the writing nibs are offset in an interleaved pattern. Each nib end of a writing electrode of the first surface of the substrate is offset by one dot width relative to a nib of a writing electrode of the second surface of the substrate in the direction along the plane of the substrate. The nib array of one surface of the substrate is, in a preferred embodiment, separated by two dot pitches from the nib array of the opposite surface of the substrate in a direction perpendicular to the plane of the substrate. However, it is readily understood that the nib array of the first surface of the substrate may be separated by n dot pitches from the nib array of the opposite surface of the same substrate, where n is an integer.

At least one ground plane consisting of a conducting material is disposed internally in the body of the substrate between the opposite surfaces. The one or more ground planes do not have to be precisely in the center of the substrate. The best performance of the writing electrodes is obtained when the ground planes are placed as close as possible to the writing nibs.

In addition, a plurality of thick film, high impedance resistor means are formed on the opposite surfaces of the substrate. Each resistor means is coupled in series, preferably as close as possible to a corresponding writing electrode for substantially eliminating the nib to ground capacitance to thereby avoid flaring. A plurality of high voltage semiconductor switch means are also provided on both surfaces of a planar substrate as in the previous embodiment. Similarly, a high voltage line is provided on opposite surfaces of the substrate for charging the writing electrodes to a high voltage when a corresponding switch means is in a first state.

An array of high impedance, thick film, pull-up resistors are also formed at opposite sides of the substrate, each pull-up resistor connecting the high voltage line with a drain of a corresponding switch means for controlling the charging current applied to each writing nib when the switch means is in a first state.

It will be appreciated that the integrated electrographic writing head of the present invention, provides substantial advantages over the prior art. The present writing head achieves significant savings in manufacturing costs over the prior art by using standard, low cost printed circuit and thick film technology. Moreover, power consumption is reduced by more than half over prior art devices because of the high impedance of each thick film pull-up resistor coupled with each writing nib. In addition, the provision of adjacent writing nibs provided on separate back-to-back substrates separated by a ground plane, or on both sides of a single substrate having an internal ground plane, substantially eliminates inter nib capacitance and flaring during the electrographic writing process.

BRIEF DESCRIPTION OF THE INVENTION

DETAILED DESCRIPTION

Referring to FIGS. 1, 2A, 2B and 3, two planar nonconducting substrates **1*a* and 1*b* are disposed in adjacent back-to-back relation. The inner surfaces of substrates 1*a* and 1*b* are bonded together according to well known printed circuit board techniques to a ground plane 2, thus forming an integrated writing head assembly 10**.

In accordance with one aspect of the present invention, the pull-up and series resistors are formed on the outer and inner surfaces of planar substrates **1*a* and Ib by thick film techniques. Substrates 1*a* and 1*b* contain a plurality of writing nibs 12*a*, 12*b* which are configured in parallel arrays disposed on an inner surface and along one edge of each substrate 1*a* and 1*b* for depositing an electrostatic charge on a dielectric recording medium 3 which is passed in close proximity to the writing nib end of the writing nibs 12*a*, 12*b*. Because each substrate 1*a* and 1*b* has the same elements, the description may be simplified by referring only to the circuit elements on substrate 1*a***.

Figure 2A:
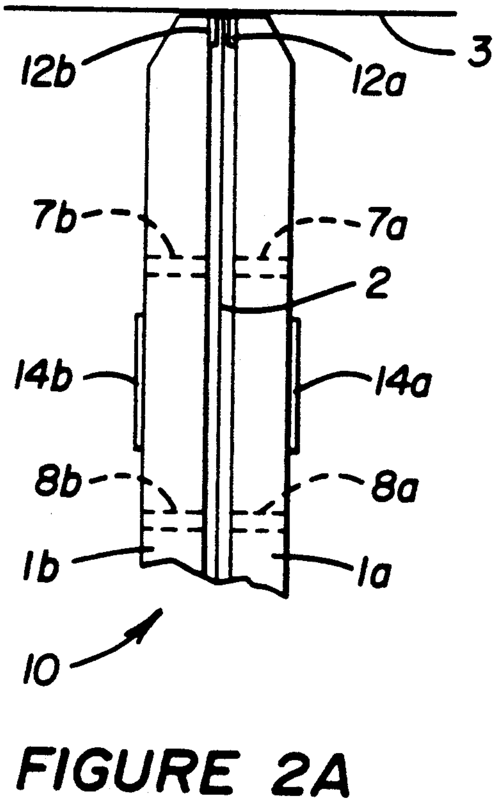
FIG. 2A is a side sectional view of an electrographic writing head according to the present invention.

The array of writing nibs **12*a* consists of traces on a printed circuit board formed according to well known techniques. Substrate 1*a* is preferably a non conducting, glass epoxy material. Each writing nib 12*a* has a nib end disposed for depositing an electrostatic charge on a paper or other dielectric recording medium 3. The opposite end of each writing nib 12*a* is coupled in series with a corresponding high impedance thick film resistor 14*a*. The thick film series resistor 14*a* may be disposed on the surface of substrate 1*a* as shown in FIG. 2*a*. In this case, each series resistor 14*a* is coupled via a through hole 7*a* with corresponding writing nib 12*a*. In an alternate embodiment as shown in FIG. 2, each series resistor 14*a* is fabricated by thick film techniques on the inner surface of substrate 1*a* and is coupled directly to corresponding writing nib 12*a*. It is preferable to place the series resistors 14*a*, 14*b* on the same surface of substrates 1*a* and 1*b* as the nibs and as close as possible to the corresponding connected writing nibs 12*a* and 12*b*** in order to eliminate inter-electrode capacitances and flaring.

Figure 3:
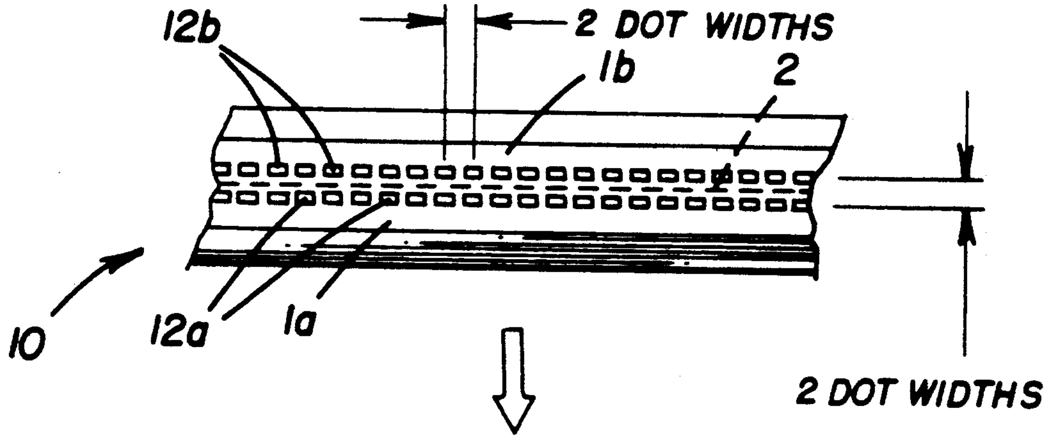
FIG. 3 is a top view of the electrographic writing head of the present invention.

In accordance with the present invention, the ends of the writing nibs **12*a* and 12*b* are exposed in cross section at the edges of the substrates 1*a* and 1*b* where the nibs 12*a*, 12*b* make contact with the recording medium as shown in FIG. 3. In order to enable the writing of dots of a given size at a pitch equal to their size, the writing nibs 12*a*, 12*b* of the respective substrates la, 1*b* are arranged in an offset, interleaved pattern as shown in FIG. 3. The writing nibs 12*a*, 12*b* on each respective substrate 1*a* and 1*b* are separated in a preferred embodiment by two dot pitches along the plane of the substrates 1***a*, 1*b*. The arrays of writing nibs 12*a*, 12*b* are also separated by two dot pitches perpendicular to the plane of the substrates 1*a*, 1*b*. Writing nibs 12*a*, 12*b* may also be separated by n dot pitches perpendicular to the plane of the substrates 1*a*, 1*b*, where n is an integer. The arrays of writing nibs 12*a* and 12*b* are also separated by at least one ground plane 2. This separation between arrays of writing nibs 12*a*, 12*b* is compensated for by altering the relative timing of the signals controlling each array of writing nibs 12*a*, 12*b* since the separation is in the direction of relative motion between the writing head assembly 10 and the recording medium.

A ground plane 2 functions as a means for preventing electrical interaction between adjacent arrays of writing nibs. The ground plane prevents or minimizes electrical interaction by shunting the electric fields of the writing nibs to ground. The ground plane 2 also provides a means for shielding the writing nibs of one substrate from the writing nibs disposed on the opposite substrate. Alternatively, the ground plane 2 may be integrally provided in the body of a single substrate in order to shield writing nibs disposed on opposite surfaces of a single substrate. More than one ground plane 2 may be disposed within multiple substrates or within a single substrate. It is not necessary that the ground plane 2 be disposed in the center of the substrate. The best performance for shunting the electric fields developed by the writing nibs 12*a* and 12*b* to ground is obtained if the ground plane 2 is located as close as possible to an array of writing nibs.

Figure 2B:
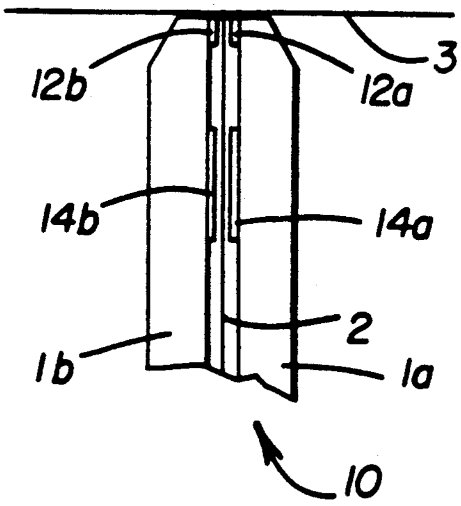
FIG. 2B is a side sectional view of an alternate embodiment of an electrographic writing head according to the present invention.

Referring now to FIGS. 2*a*, 2*b* and 3, the ground plane 2 is preferably a continuous plane, screen, grid or the like of metal or other conductive material. The ground plane typically is spaced away from the nibs at a distance on the order of the width of a writing nib. The ground plane 2 is extremely important in controlling the shape of the electric field lines around each individual writing nib of the writing electrodes 14*a*, 14*b*. When there is a large voltage differential between adjacent writing electrodes 12*a*, 12*b* on opposite substrates 1*a*, 1*b* the ground plane acts to control the shape of the field around the energized writing nib and shunts the electric field lines to ground. It has been found that the electric field lines of high writing voltages at an energized writing nib can be effectively terminated at the ground plane thereby substantially eliminating crosstalk between the nibs.

The ground plane also provides a means for terminating electric field lines developed around the writing nibs. In the preferred embodiment, the ground plane is electrically isolated from the writing nibs by a thin layer of the nonconducting epoxy material. It has been found that the effect of the ground plane in controlling the shape of the electrical field around the writing nibs 12*a*, 12*b* can be maximized if each array of writing electrodes 12*a*, 12 is spaced apart from the ground plane at a distance equal to or less than the width of a writing nib. However, the ground plane should be as close as possible to the nibs.

It will be appreciated that the ground plane 2 enables the opposing substrates 1*a*, 1*b* to be placed back to back without electrical interaction. The ground plane 2 also enables arrays of writing nibs to be placed an opposite sides of the same substrate without electrical interaction. It has also been found that the ground plane substantially eliminates intercoupling capacitance between adjacent nibs and keeps adjacent inactive or unaddressed nibs from discharging.

Figure 4:
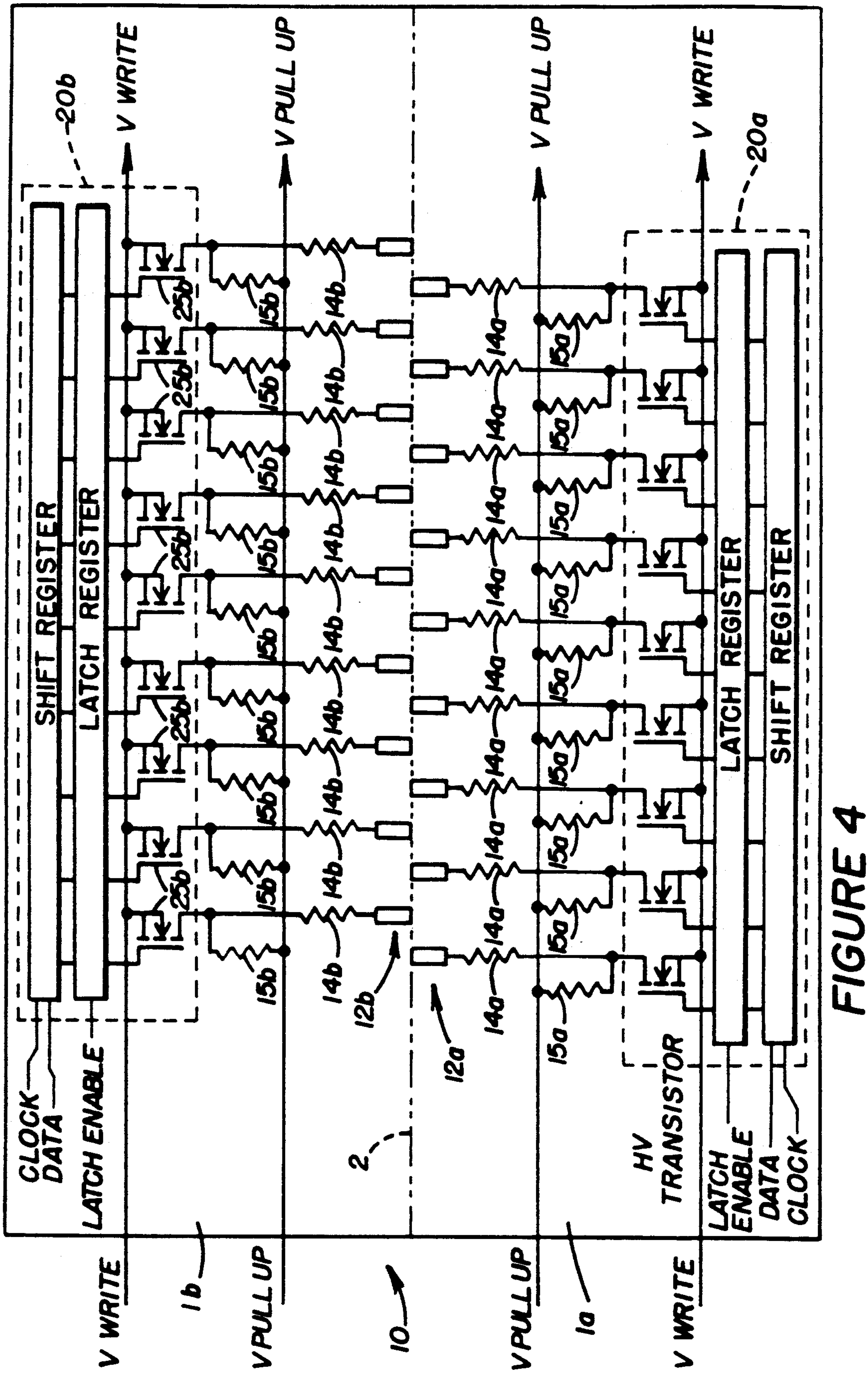
FIG. 4 is a schematic illustration of the circuit of the present invention.

Referring to FIG. 4, adjacent arrays of writing electrodes or writing nibs 12*a*, 12*b* are provided on respective separate substrates 1*a*, 1*b* which are joined together by any convenient bonding method to opposite sides of a ground plane 2. The writing nibs 12*a*, 12*b* form an offset, interleaved pattern along the axis formed by the ground plane 2. In accordance with the present invention, each writing nib 12*a*, 12*b* on respective substrates 1*a*, 1*b* is connected through a corresponding high impedance series resistor 14*a*, 14*b* to the drain of a single switch means 25*a*, 25*b*.

In the preferred embodiment, switch means 25*a*, 25*b* comprise high voltage MOSFET transistors. Each MOSFET has its drain connected to the series resistor 14*a*, 14*b* its source coupled to a negative voltage line, $V_{write}$ and its gate coupled to a data line via a latch register and shift register.

A high voltage line $V_{pull\text{-}up}$ provides a high voltage for activating the arrays of writing nibs 12*a*, 12*b*. High voltage line $V_{pull\text{-}up}$ has a connection with each drain of switch means 25*a*, 25*b* through a corresponding thick film, high impedance pull-up resistor 15*a*, 15*b*.

It will be appreciated that each MOSFET switch 25*a*, 25*b*, together with its corresponding pull-up resistor 15*a*, 15*b* forms a high voltage driver capable of swinging its output voltage between the levels of $V_{write}$ and $V_{pull\text{-}up}$. $V_{write}$ is approximately −500 volts relative to a counter electrode (not shown) which is at ground potential. The high voltage $V_{pull\text{-}up}$ is high enough above the negative voltage $V_{write}$ to avoid any electric discharge in the gap between the recording medium and the writing nibs 12*a*, 12*b* when the nibs are in their inactive state.

The high voltage drivers comprising semiconductor switch means 25*a*, 25*b* and associated thick film pull-up resistors 15*a*, 15*b* are preferably disposed on the outer layers of corresponding substrates 1*a*, 1*b*. The driver circuits connect via plated through holes 8*a*, 8*b* (as shown in FIG. 2A) through corresponding substrates 1*a*, 1*b*. Trace lines then connect the driver circuits to the associated series resistors 14*a*, 14*b* and the writing electrodes 12*a*, 12*b*. Note that the two inner surfaces of substrates 1*a*, 1*b* are continuously separated by the ground plane 2. Although the series resistors 14*a*, 14*b* may be on the outside surfaces of the respective substrates 1*a*, 1*b*, it is preferable to put them on the same surface as the writing nibs 12*a*, 12*b* and as close as possible to the writing nibs 12*a*, 12*b* in order to minimize the capacitance at the writing nib and in order to eliminate a large number of feedthrough holes.

It is preferable that the nib resistors 14*a*, 14*b* should be arranged in a line so that all are the same distance from the writing nib line, rather than in a two dimensional array. The two dimensional array may yield a periodic variation in nib capacitance causing visible striations on a plot. Although these striations would be much less severe than those from a multiplexed writing head, they nevertheless would detract from writing quality.

An alternate embodiment of the present invention would enable fabrication of in-line resistors which would allow the nib resistors 14*a*, 14*b* and the pull-up resistors 15*a*, 15*b* to be made at once on the same side of a substrate 1*a* or 1*b*. If both the pull-up resistors 15*a*, 15*b* and the nib resistors 14*a*, 14*b* are put on the same surface of a substrate 1*a* or 1*b* as shown in FIG. 2*b*, two more feedthrough holes per writing nib are eliminated, leaving one feedthrough hole per nib.

In accordance with another aspect of the invention, a very dense integrated circuit package, for example, tape automated bonding (TAB), may be used for the driver circuitry. In this manner, it is possible to keep all circuitry on the outside surface of the substrate, thus eliminating all feedthrough holes in the writing array. This has the advantage of making it possible to build the writing head out of only one substrate with arrays of writing nibs and related circuitry on opposite surfaces of the substrate. The substrate has at least one intermediate ground plane disposed inside the substrate along substantially its entire longitudinal axis and parallel to the plane of the substrate. The ground plane provides a means for shielding the arrays of writing nibs disposed on the opposite surfaces of the substrate. Such an internal ground plane can be manufactured integrally with the substrate by a substrate manufacturer at a comparatively low cost.

Figure 1:
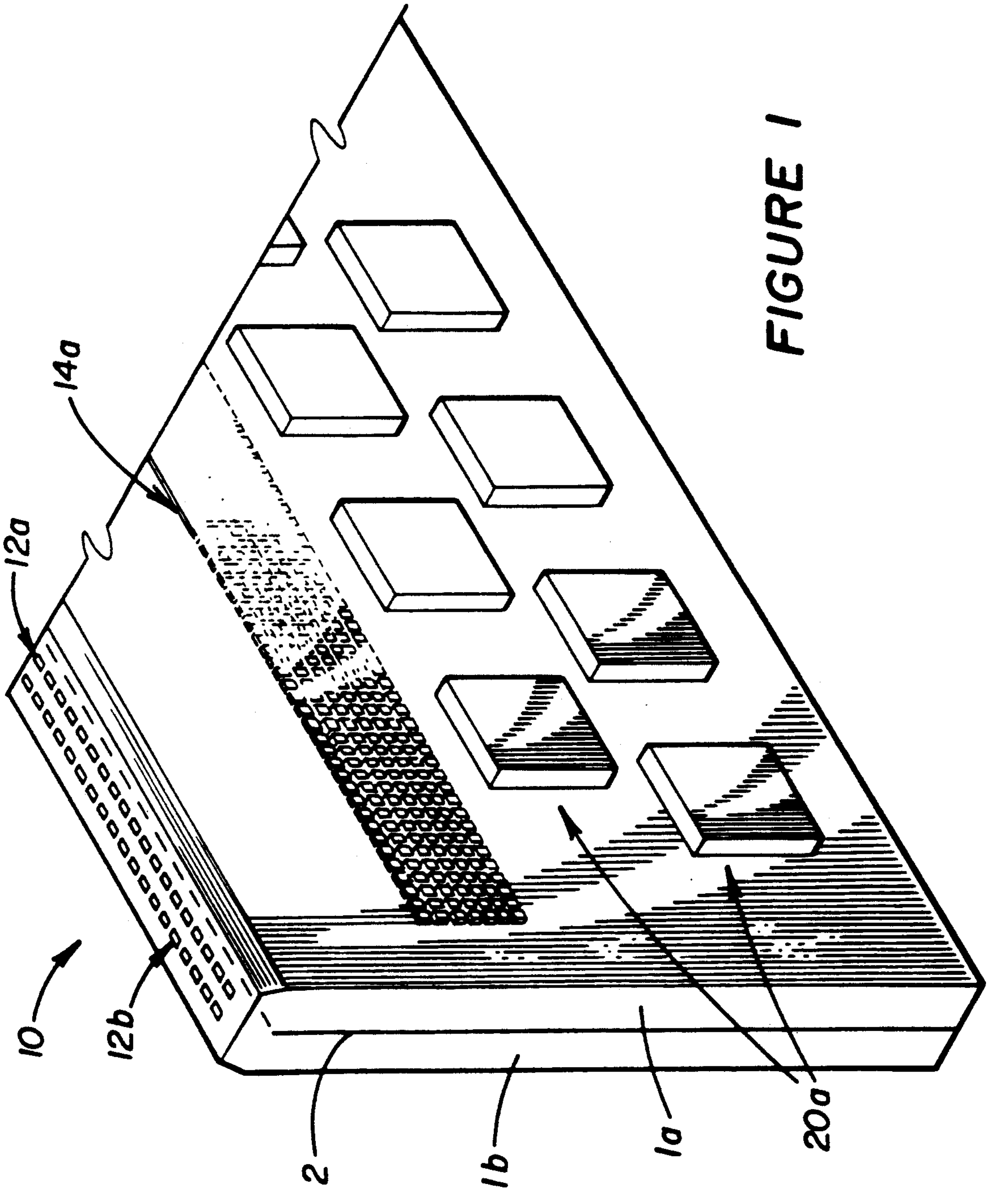
FIG. 1 is a perspective view of an integrated electrographic writing head according to the present invention.
Figure 5A:
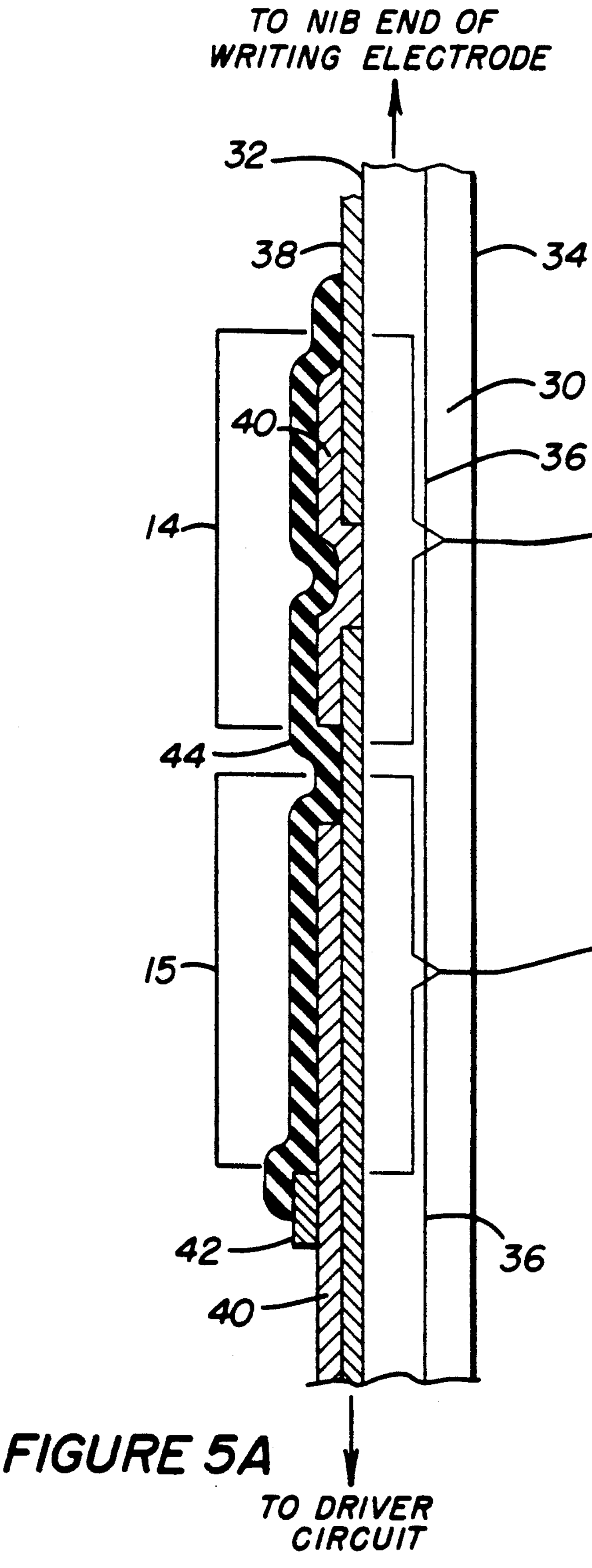
FIG. 5A is a side sectional view through one substrate of an electrographic writing head according to the present invention showing both nib and pull-up resistors on the same side of the substrate.
Figure 5B:
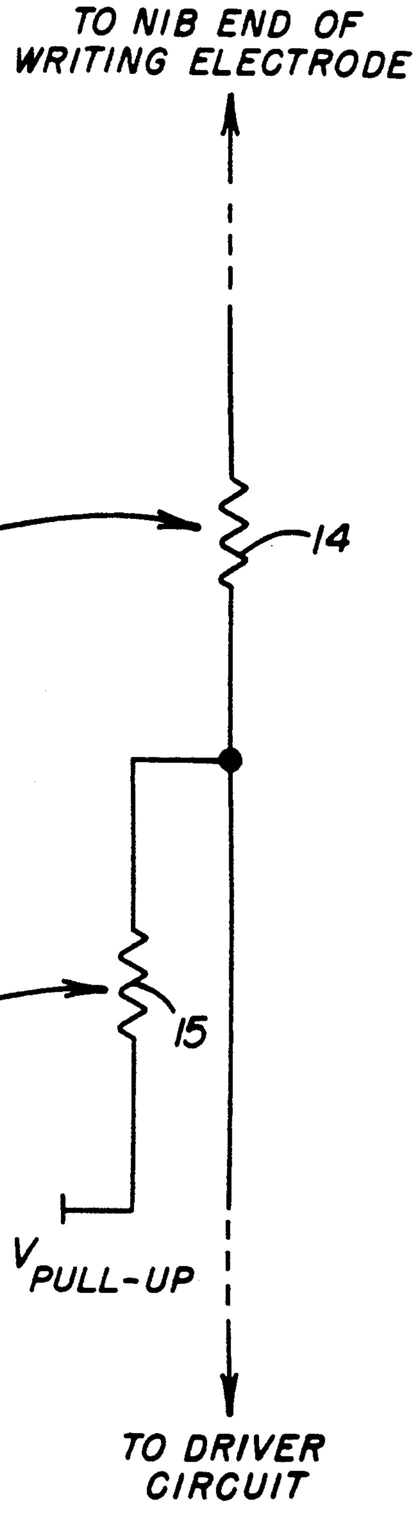
FIG. 5B shows the equivalent circuit of the writing head shown in FIG. 5A.

This arrangement can be seen from FIGS. 5A and 5B. FIG. 5A shows a cross-section through one substrate 30 which forms a writing head assembly 10 as shown in FIG. 1. The writing head assembly 10 may be disposed across the full width of a recording medium. A substrate 30 has first and second opposed major surfaces 32 and 34. At least one ground plane 36 is disposed at an intermediate point within the substrate between the opposed surfaces 32 and 34. The ground plane may be any conductive material having a connection with ground, but it is preferably metal. The ground plane 36 is preferably a thin, continuous, planar member or may be a screen or grid. The ground plane 36 may be fabricated according to well known techniques integrally with the formation of the substrate.

An advantage of using only a single substrate 30 is that of substantially reduced cost by elimination of feedthrough holes and reduced complexity. The substrate thickness determines the spacing between the two rows of writing nibs (as shown in FIG. 3) and would be made an integral multiple of the dot pitch.

The ground plane 36 substantially eliminates variations in nib capacitance which could cause visible striations on a plot. It is also possible to achieve an enhanced shielding effect by disposing two or more ground planes internally within the body of the substrate 30. It is not necessary that the ground planes be in the center of the substrate. In order to maximize the performance of the writing nibs, the ground planes should be located as close as possible to the arrays of writing nibs.

In accordance with another aspect of the invention, a novel technique is provided for fabricating the thick film nib and pull-up resistors 14 and 15, respectively. The resistor fabrication technique is identical for either of the foregoing aspects of the invention described above. That is, the same technique can be used to fabricate pull-up and nib resistors which are provided on separate back to back substrates or on opposite surfaces of the same substrate.

Referring again to FIGS. 5A and 5B, there is shown a cross-section through one substrate 30. Substrate 30 is preferably a printed circuit board substrate. However, any suitable semiconductor or nonconductive substrate having a high degree of resistivity may be used. Substrate 30 is provided with at least one intermediate ground plane 36 which is preferably included by the substrate manufacturer during the formation of the substrate. The ground plane 36 forms a shielding means which is disposed in a plane parallel to the plane of the substrate. The ground plane 36 runs along the longitudinal axis or generally along the length of the substrate plane as may be seen from FIGS. 5A, 5B and 3. Additional ground planes may be used to provide an enhanced shielding effect. The ground planes should be located as close as possible to the writing nib arrays to shunt electric field lines developed at the writing nibs to ground.

Figure 6:
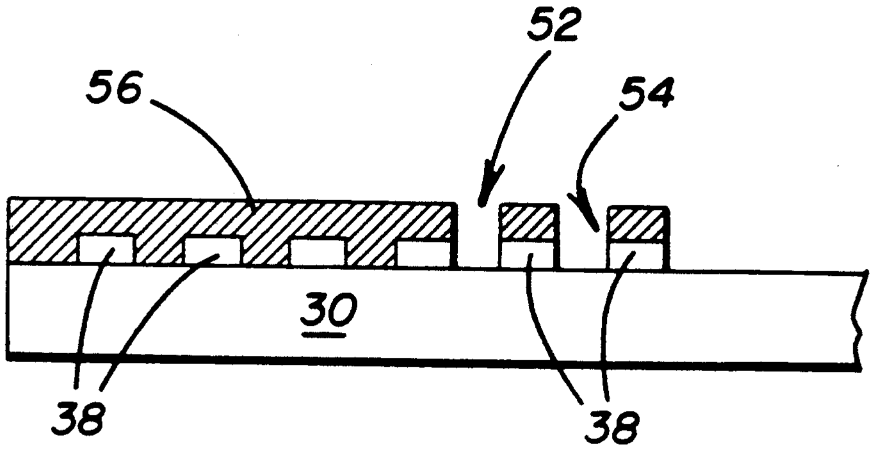
FIG. 6 shows a cross sectional view of a writing head and method for manufacturing the resistors in accordance with the present invention.

Referring to FIGS. 5A, 5B and 6, a metal trace layer 38 is provided on a surface 32 of the substrate in accordance with well known techniques. It will be appreciated that the metal trace layer and other appropriate circuitry are also provided on the opposite surface 34 of the substrate 30. However, because the fabrication techniques are identical, only one surface of the substrate need be described for the sake of clarity.

To form the array of metal traces that will each form a writing nib, the metal layer 38 is masked and etched or otherwise patterned in accordance with well known printed circuit techniques to form discrete connections between a writing nib end and driver circuitry. This has the advantage of low cost and extreme durability over the prior art which may include complex chemical vapor deposition or other techniques.

All writing nibs are subject to erosion by the arcing process inherent in electrostatic writing. Because thick film writing nibs of the present invention are thicker than prior art nibs, they will not erode as quickly. The erosion rate is dependent on the mass of metal in the nib trace. In addition, the epoxy substrate of the present invention is softer than the ceramic or silicon substrates of the prior art and has the advantage that it will wear so as to compensate for nib erosion.

Each metal trace 38 has a first end which terminates in a writing nib 12*a*, 12*b* such as those shown in FIGS. 1, 2A, 2B and 3, and has a second end connected to driver circuitry. The arrays of writing nibs are disposed on opposite surfaces of the substrate 30, along an edge thereof. The metal traces 38 are preferably on the order of one dot pitch wide (e.g. 5 mils or 0.005 inches) and are preferably spaced two dot pitches apart (e.g. 10 mils or 0.010 inches).

A first layer of dielectric polymer 40 is selectively provided by silk screening on top of the metal trace layer 38 in accordance with well known thick film techniques. Polymer layer 40 is patterned to leave openings where it is desired to provide a contact to the metal layer 38. A conductive polymer layer 42 is then provided over the first polymer layer 40. A third resistor polymer layer 44 is in turn provided over the conductive polymer layer 42. The respective polymer layers 40, 42 and 44 are screen printed and oven cured successively at about 180° C. over the metal traces 38 in the order: dielectric, conductor and resistor. Each polymer layer 40, 42 and 44 extends the full width of the writing head.

A connection is made from one end of the metal or conductor trace 38 to the $V_{pull\text{-}up}$ supply as shown in FIGS. 5A and 5B. The metal traces 38 at the bottom portion of the substrate 30 of FIG. 5A connect to the driver circuitry. The metal traces 38 at the top portion of substrate 30 connect to the writing nib ends (not shown).

The method of fabricating the thick film resistor elements in a writing head according to the present invention may be seen from FIG. 6. FIG. 6 represents a simplified cross section of a writing head in accordance with the present invention.

It is not possible to screen print polymers with the required resolution to form resistors only 5 mils (0.005 ins.) wide. Therefore, in accordance with one aspect of the invention, the thick film resistors 14 and 15 are formed subtractively by selectively removing portions of a broad stripe of cured polymer into narrow lines after screen printing. As may be seen from FIG. 6, the substrate 30 is provided with a metal layer which has been patterned into discrete traces 38 as described above. The broad stripes of polymer material, shown generally at 50, are then provided successively over the metal traces and oven cured at low temperature, on the order of approximately 180° C. Low temperature oven curing is an advantage over the prior art because it allows for implementation of a broad range of materials for use as a substrate. For example, standard, prior art surface mount resistors are made from ceramic and metal. The prior art ceramic and metal resistors require a higher cure temperature. Such prior art resistors are expensive as compared to the thick film polymer resistors of the present invention and are not as desirable for implementation in an electrographic writing head.

The preferred method for removing portions of the polymer is by cutting the polymer with an excimer ultra-violet laser or the like. What is essential is a means for removing polymer material by an ablation process that does not heat the surrounding material. At present, the excimer ultra-violet laser is the preferred tool. It leaves no charring or thermal distortion, unlike other lasers operating at different wavelengths. However, the removal process may be performed by the application of synergistic stimulation having a predetermined wavelength which does not heat surrounding material. Each cut portion 52 of the polymer material 50 forms a pair of resistors 14 and 15 on top of their associated traces 38 with the connections to the pull-up line, the driver circuit and the nib end as shown in FIGS. 5A, 5B and 6.

A second method of cutting the polymer layers to form resistors 14 and 15 is by using a wafer dicing saw or the like. However, this method is slower and does more damage to the slot edge 54 of the resistors than the laser.

A third method of forming the polymer layers is by direct writing where each line of resistor polymer is deposited from a syringe before curing. This method is slower than the saw and produces rougher edges than the saw method.

After the resistors 14 and 15 are formed and tested, they are coated with another layer of dielectric material for protection.

The semiconductor driver circuitry as shown at 20*a*, 20*b* in FIG. 4 is packaged in standard surface mount plastic packages which are commercially available. In the preferred embodiment, the semiconductor switches are packaged in groups of 64 with a 64 bit latch and a 64 bit shift register on the same silicon die.

The integrated circuits comprising shift registers and high voltage MOSFETs are disposed on respective outer surfaces of substrates 1*a* and 1*b* as shown in FIGS. 1 and 4. Alternatively, the shift registers may be disposed on opposite surfaces of a single substrate having an intermediate ground plane. These shift registers are cascaded together to form a single register of more than two thousand bits. By appropriate control of the shift register clock and data signals and the enable signal to the latch register, it is possible to load any arbitrary pattern into the latch register which directly controls the gates o the high voltage MOSFET switches 25*a*, 25*b* on each respective substrate or surface.

It will be appreciated that each writing nib on a single surface or substrate, for example 1*a*, is connected to single corresponding high voltage driver circuit 20*a*. Thus, in accordance with the present invention, there is one complete drive circuit 20*a*, 20*b* associated with each writing nib 12*a*, 12*b* of the array of writing nibs. It will be appreciated that the present invention completely eliminates multiplexing at the writing nibs thereby overcoming the prior art problems of banding and striations in the written image.

Further in accordance with the present invention, each writing nib 12*a*, 12*b* is connected to its associated high voltage driver 20*a*, 20*b* through a series resistor 14*a*, 14*b* which decouples the corresponding writing nib 12*a*, 12*b* from the capacitance of the printed circuit trace providing the voltage to each writing nib, thereby minimizing the problem of flaring. Therefore, the only capacitance capable of delivering energy to form a flare is downstream of the series resistors 14*a*, 14*b*. The closer the series resistors 14*a*, 14*b* are to the associated writing nibs 12*a*, 12*b*, the smaller will be the parasitic capacitance of the circuit trace since capacitance is proportional to the printed circuit trace area at each writing nib 12*a*, 12*b*.

In operation, a high logic signal applied to the gate of a selected switch means 25*a*, (or 25*b*) turns the switch on and current from high voltage line $V_{pull\text{-}up}$ flows through pull-up resistor 15*a* into the drain of switch means 25*a* and to the negative supply $V_{write}$. When a switch means 25*a* or 25*b* is enabled, the nib voltage is pulled down to the level of $V_{write}$ and discharges. The level of the writing voltage $V_{write}$ is approximately −500 volts. Thus, a large negative voltage is applied across the gap between a writing electrode 14*a*, 14*b* and a counter electrode on the opposite side of the recording medium The large negative voltage creates a discharge from the writing nibs 14*a*, 14*b* which deposits charge on the paper or other recording medium. When the gate of a switch means 25*a*, 25*b* is in an off state, there is not enough voltage supplied to writing nibs to create a discharge.

It will be appreciated that the non-multiplexed nature of the present invention, wherein each high voltage driver 20*a* is connected to a single corresponding writing nib 12*a*, provides a significant advantage over the prior art in terms of writing quality because banding is eliminated.

In the present invention, the writing nibs 12*a*, 12*b* are planar so that when dots of charge are deposited on the recording medium 3, the size of the dot in the direction of motion is defined by the time that the nib is energized and the speed of the recording medium 3 relative to the writing head 10. The resistors 15*a* and 14*a* in series with writing nib 12*a* form an RC circuit. The time constant of the RC circuit is determined by the capacitance between writing nibs 12*a* and ground and the series resistors 14*a*.

In the present invention, pull-up resistors 15*a* are thick film, high impedance resistors on the order of 20 megohms. The use of one high voltage driver 20*a* per writing nib 12*a* provides a relatively long write time per nib as compared to a prior art multiplexed writing head. Therefore, in the present invention the switching means 25*a*, 25*b* do not need to be as fast as they would for a multiplexed writing head. Furthermore, because in the present invention the entire high voltage driver circuit 20*a*, 20*b* is integrated onto a single substrate, stray capacitance is minimized. This, taken together with the lenient timing constraints due to the non-multiplexed nature, allow the use of very high impedance pull-up resistors 15*a*, 15*b*.

Due to the high impedance pull-up resistors 15*a*, 15*b* power requirements are kept at a minimum. In fact, it has been found that the power required by the present invention is less than one half of that required by a conventional, prior art electrographic writing head. At the same time, the charge up time and writing speed of the writing nibs 12*a*, 12*b* is kept within one hundred microseconds.

It will be appreciated that the present invention, in using thick film techniques for fabricating the resistor networks, is a significant departure from the prior art. The prior art focuses largely on thin film technology in order to reduce the intercoupling capacitance between writing nibs. For example, in U.S. Pat. No. 4,766,450 it was thought that thin film elements were essential to minimize intercoupling capacitance between writing nibs by reducing the cross sectional area of the nib.

Accordingly, the writing tips of the writing nibs in U.S. Pat. No. 4,766,450 are only 0.5 to 1 micron thick. (See col. 4, line 66.)

However, it has been found that according to the present invention, writing nibs and associated elements can be at least 40 microns thick. Intercoupling capacitance can be substantially eliminated by using thick film elements fabricated on two separate substrates which are disposed on back-to-back relation and separated by a ground plane. The use of thick film elements according to the present invention provides substantial economic savings in manufacturing costs because thick film elements may be applied by a simple screening process to a glass epoxy substrate. In contrast, thin film elements are expensive to manufacture and must be deposited by a vacuum evaporation or sputtering method.

Accordingly, the present invention provides an improved integrated thick film writing head consisting of thick film elements which are screened on two or more separate substrates. The thick film high impedance resistors of the present invention are capable of withstanding high voltages while at the same time 18 providing greatly reduced power dissipation and increased savings in terms of operation costs and reliability. The configuration of back-to-back substrates separated by at least one ground plane virtually eliminates intercoupling capacitances and provides enhanced writing resolution.

In accordance with another aspect of the invention, the writing nibs and associated circuitry are provided on both sides of a single substrate having at least one internal ground plane for shunting electric fields developed from the writing nibs to ground and for substantially eliminating inter nib capacitance.

Finally, the use of thick film resistors allows the present writing head to be non-multiplexed wherein each separate writing nib is connected to a single high voltage driver.

While the invention has been described in connection with what is presently considered to be the most practical and preferred embodiments, it is to be understood that the invention is not limited to the disclosed embodiment but, on the contrary is intended to cover various modifications and equivalent arrangements included within the spirit and scope of the appended claims.

What is claimed is:

1. A method for forming an electrographic writing head from a single planar substrate having opposite major surfaces including an array of writing nibs, a corresponding high impedance nib resistor and high voltage pull-up resistor associated with each nib of said array of writing nibs disposed on each of said opposite surfaces of the substrate comprising the steps of:

providing at least one shielding means internally within the body of said substrate extending parallel to the plane of said substrate for shunting electric field lines to ground;

providing an array of substantially parallel metal traces over each opposite surface of said substrate;

providing a first layer of dielectric polymer over said metal traces;

providing a second layer of conductive polymer over said dielectric polymer;

providing a third layer of insulating polymer over said conductive polymer;

selectively removing portions of said first, second and third polymer layers such that the remaining portions of said polymer layers form a nib and a pull-up resistor each having a connection with a corresponding one of said metal traces.

2. The method according to claim 1 wherein said step of selectively providing an array of metal traces includes the step of patterning and etching a metal layer to provide an array of metal traces on each surface of said substrate.

3. A method for forming an electrographic writing head according to claim 1 wherein said step of selectively providing a first layer of dielectric polymer includes the steps of selectively screening the polymer over the metal traces and oven curing said polymer at a temperature on the order of 180 degrees C.

4. A method for forming an electrographic writing head in accordance with claim 1 wherein the step of selectively providing the second layer of conductive polymer further includes the steps of screen printing the conductive polymer layer over the dielectric polymer layer and oven curing said conductive polymer layer at a temperature on the order of 180 degrees C.

5. A method for forming an electrographic writing head in accordance with claim 1 wherein the step of selectively providing the third layer of insulating polymer includes the steps of screen printing the insulating polymer layer over the conductive polymer layer and oven curing the insulating polymer layer at a temperature on the order of 180 degrees C.

6. A method for forming an electrographic writing head according to claim 1 wherein the step of forming the resistors by removing selected portions of said polymer layers includes the step of removing selected portions of said polymer layers by ablation, whereby each ablated portion forms a nib and pull-up resistor having a connection with an associated metal trace.

7. A method for forming an electrographic writing head as in claim 6 wherein said step of removing said polymer layers by ablation includes the step of removing selected polymer material by an excimer ultraviolet laser, or the like.

8. A method for forming an electrographic writing head according to claim 6 wherein said step of removing said polymer layers by ablation includes the step of cutting through said polymer layers by using a wafer dicing saw.

9. A method for forming an electrographic writing head according to claim 1 wherein the step of selectively forming the successive dielectric, conductor and insulating polymer layers comprises the step of successively depositing and curing each of said polymer layers in a line over an associated metal trace.

10. A method for forming an electrographic writing head according to claim 1 wherein said step of forming the resistors includes coating the finally formed resistors with another layer of dielectric material.

11. A method for forming an electrostatic writing head or the like from a single substrate including an array of writing nibs, corresponding nib resistors and pull-up resistors on each surface of said single substrate wherein each writing nib forms a dot of electrostatic charge on a recording medium and each writing nib has a connection with a corresponding nib resistor and high voltage pull-up resistor comprising the steps of:

providing at least one shielding means internally within the body of said substrate extending parallel to the plane of said substrate for shunting electric field lines to ground;

providing an array of substantially parallel metal traces on each surface of said substrate, each metal trace culminating in writing nib along an edge of each substrate surface;

providing a first layer of dielectric polymer over said metal traces;

providing a second layer of conductive polymer over said dielectric polymer;

providing a third layer of insulating polymer over conductive polymer;

selectively removing portions of said first, second and third polymer layers such that the remaining portions of said polymer layers form corresponding nib and pull-up resistors with an associated metal trace.

12. A method for forming an electrographic writing head according to claim 11 wherein each metal trace is at least one dot pitch wide.

13. A method according to claim 11 wherein at least one shielding means is located parallel to the plane of said substrate and as close as possible to at least one of said arrays of metal traces.

14. A method according to claim 11 wherein said step of providing a shielding means includes the step of providing at least one ground plane internally through approximately the center of said substrate.

15. A method according to claim 11 wherein said step of providing a shielding means includes the step of providing a ground plane integrally within the body of said substrate and between said arrays of metal traces.

16. A method according to claim 11 wherein said step of providing said polymer layers includes the steps of screen printing and of curing successively over the metal traces, said dielectric, conductor, and insulator polymer layers, respectively.

17. A method according to claim 16 wherein said step of providing said nib and pull-up resistors includes the step of forming said resistors subtractively by selectively removing portions of said cured polymer layers to form said nib and pull-up resistors each having desired connections with a corresponding metal trace after screen printing.

18. A method of forming nib and pull-up resistors according to claim 17 wherein said step of removing portions of cured polymer includes the step of removal by ablation.

19. A method of forming nib and pull-up resistors according to claim 18 wherein said step of removal by ablation includes the step of removing said polymer layers by a source of synergistic stimulation having a predetermined wave length which does not heat surrounding material.

* * * * *